(12) United States Patent  (10) Patent No.: US 12,399,526 B2
Micaelian  (45) Date of Patent: Aug. 26, 2025

(54) FOLDABLE PORTABLE ELECTRONIC DEVICE

(71) Applicant: Fadi Victor Micaelian, Menlo Park, CA (US)

(72) Inventor: Fadi Victor Micaelian, Menlo Park, CA (US)

(73) Assignee: Viteds, LLC, Menlo Park, CA (US)

( * ) Notice: Subject to any disclaimer, the term of this patent is extended or adjusted under 35 U.S.C. 154(b) by 0 days.

(21) Appl. No.: 17/896,169

(22) Filed: Aug. 26, 2022

(65) Prior Publication Data

US 2023/0056818 A1 Feb. 23, 2023

Related U.S. Application Data

(63) Continuation of application No. 17/244,793, filed on Apr. 29, 2021, now abandoned, which is a continuation of application No. 14/179,996, filed on Feb. 13, 2014, now abandoned.

(60) Provisional application No. 61/801,259, filed on Mar. 15, 2013, provisional application No. 61/764,965, filed on Feb. 14, 2013.

(51) Int. Cl.
  *G06F 1/16* (2006.01)
(52) U.S. Cl.
  CPC .......... *G06F 1/1615* (2013.01); *G06F 1/1641* (2013.01); *G06F 1/1647* (2013.01)
(58) Field of Classification Search
  CPC .... G06F 1/1615; G06F 1/1641; G06F 1/1647; G06F 1/16; G06F 1/1616; G06F 1/1681
  USPC ................................................. 361/681–683
  See application file for complete search history.

(56) References Cited

U.S. PATENT DOCUMENTS

| | | | |
|---|---|---|---|
| 7,782,274 B2 | 8/2010 | Manning | |
| 10,234,902 B2 | 3/2019 | Delaporte | |
| 2002/0135535 A1 | 9/2002 | Muller | |
| 2004/0212602 A1* | 10/2004 | Nako | G06F 1/169 |
| | | | 345/173 |
| 2007/0279315 A1 | 12/2007 | Laves et al. | |
| 2007/0282687 A1 | 12/2007 | Laves | |
| 2008/0192416 A1 | 8/2008 | Kim | |
| 2010/0058205 A1* | 3/2010 | Vakil | G06F 1/1647 |
| | | | 715/761 |
| 2010/0085697 A1 | 4/2010 | Park et al. | |
| 2010/0271769 A1 | 10/2010 | Shanmugam et al. | |
| 2011/0051346 A1 | 3/2011 | Nguyen | |
| 2011/0211305 A1 | 9/2011 | Gandhi et al. | |
| 2011/0227822 A1* | 9/2011 | Shai | G09G 5/003 |
| | | | 345/156 |
| 2012/0242588 A1 | 9/2012 | Myers et al. | |
| 2013/0010405 A1 | 1/2013 | Rothkopf et al. | |
| 2013/0217443 A1 | 8/2013 | Lim et al. | |

(Continued)

*Primary Examiner* — Ankur Jain

(74) *Attorney, Agent, or Firm* — Appleton Luff

(57) ABSTRACT

A portable electronic device can act as a music player, gaming device and a smart phone combined. The device has multiple panels each with a display. The panels are connected in a manner to permit the device to be opened and closed such as by folding the panels. When folded the a device is compact and able to held in the palm of a hand, yet such a device can be extended into a larger form factor, such as the size of commonly available tablets. Furthermore, when in proximity to a large display device, such a device can act like a laptop or personal computer through a local connection such as Bluetooth, Wi-Fi, or other communication protocol to the display.

23 Claims, 8 Drawing Sheets

(56) References Cited

U.S. PATENT DOCUMENTS

| | | |
|---|---|---|
| 2014/0042406 A1 | 2/2014 | Degner et al. |
| 2014/0049911 A1 | 2/2014 | Corbin et al. |
| 2014/0152576 A1 | 6/2014 | Kim et al. |
| 2018/0210514 A1* | 7/2018 | Wang .................... G06F 1/1669 |

* cited by examiner

FOLDABLE PORTABLE ELECTRONIC DEVICE

RELATED APPLICATIONS

This application is a continuation of and claims the benefit of U.S. utility application Ser. No. 17/244,793 filed on Apr. 29, 2021, which application is a continuation of and claims the benefit of U.S. utility application Ser. No. 14/179,996 filed on Feb. 13, 2014 which application claims the benefit of provisional application No. 61/764,965 filed on Feb. 14, 2013, and provisional application No. 61/801,259 filed on Mar. 15, 2013.

FIELD OF THE INVENTION

This invention relates generally to the field of electronic devices and more particularly to portable electronic devices.

BACKGROUND

Today we carry several devices such as music players, gaming devices, smartphones, tablets, laptops, personal computers, and use an ever-growing number of display devices such as monitors, TVs, projectors etc. With the proliferation of computing forms this problem will only continue to worsen. Currently there are several alternatives to solve this challenge. One such solution is to store files on a flash drive and transfer them from a device to another device that has the compatibility and ability to read the flash drive. Another alternative is to share the content in the cloud. But most of these solutions do not solve the problem of having to have a plethora of devices. Another solution is to build a Personal Computer (PC) that fits in a flash card, and build various devices that can accept the flash card. The problem with these solutions is that they all look at convergence from a perspective of having various devices and being able to make them interact and share documents, files, applications, storage, memory or OS.

SUMMARY

A variety of computing devices that accommodate a variety of uses are disclosed herein. As computing power (measured by the amount of RAM and CPU Clock speed and amount of Cores) keeps growing, it is advantageous for personal computing devices to reside in a single device that can act as a music player, gaming device and a smart phone combined.

Devices incorporating the principles disclosed herein can be compact, in a folded or closed mode, or extended or open, partially or fully. When folded such a device is compact and able to held in the palm of a hand, yet such a device can be extended into a larger form factor, such as the size of commonly available tablets. Furthermore, when in proximity to a large display device, such a device can act like a laptop or personal computer through a local connection such as Bluetooth, Wi-Fi, or other communication protocol to the display. Such devices are characterized by their ubiquitous nature. They can be carried anywhere and work anywhere, either alone, or in conjunction with other devices such as larger display devices.

One of the key features of such a device is its portability. i.e. carrying the device is very convenient. The device when folded can be held in the palm of a person's hand, and act as a smartphone, PDA, music player, GPS system, gaming station, etc. Yet it can be unfolded and takes the shape of a device with a larger screen, such as a tablet. When unfolded the device offers a sufficiently large screen so images displayed by the device are easily legible, useable for most common tasks and user-friendly.

In further embodiments, whenever located in the proximity of a compatible peripheral which may be a TV, a monitor, a printer, an I/O device etc. such a device can connect with a single click or other simple, intuitive, user action, thus providing a more comfortable interface. This connection permits automatic identification of the properties of the nearby display/peripheral and accommodates the relevant settings to take advantage as much as possible of the display/peripheral.

Users of such devices will not need to carry with them multiple devices such as a smartphone, a tablet and a laptop when traveling, or when going to the office, or on vacation. All three devices are combined in one. As the processing power and the ability to increase the memory capacity in a thin device increases, users of such device will have a phone that will fit in their pocket. This device will be connected to the "cloud", so they will have instant access to their favorite music, movies, multi-media, emails, calendars, address books, games, documents etc.

Devices disclosed herein also offer the ability to extend the screen size to a size approximately four times the surface of the device when folded. This makes it easier to browse the web, read a newspaper, view a movie, prepare a presentation or a spreadsheet, or draft a report.

Once the user is at home, back in the office or in an environment where the device can connect via Bluetooth (or other wireless protocol) to a monitor, a mouse, a keyboard, a gesture based I/O, a TV screen, a printer, a storage system, etc., the user is able to use these peripherals to interact with the device with a single user action. The device scans for other devices and peripherals, identifies them, and lists them. Upon a user-triggered request, the device establishes a handshake, identifies the optimal settings for the external device or peripheral and creates a connection with optimal settings.

Additional aspects related to the invention will be set forth in part in the description which follows, and in part will be apparent to those skilled in the art from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques. Specifically.

DETAILED DESCRIPTION

Figure 1:
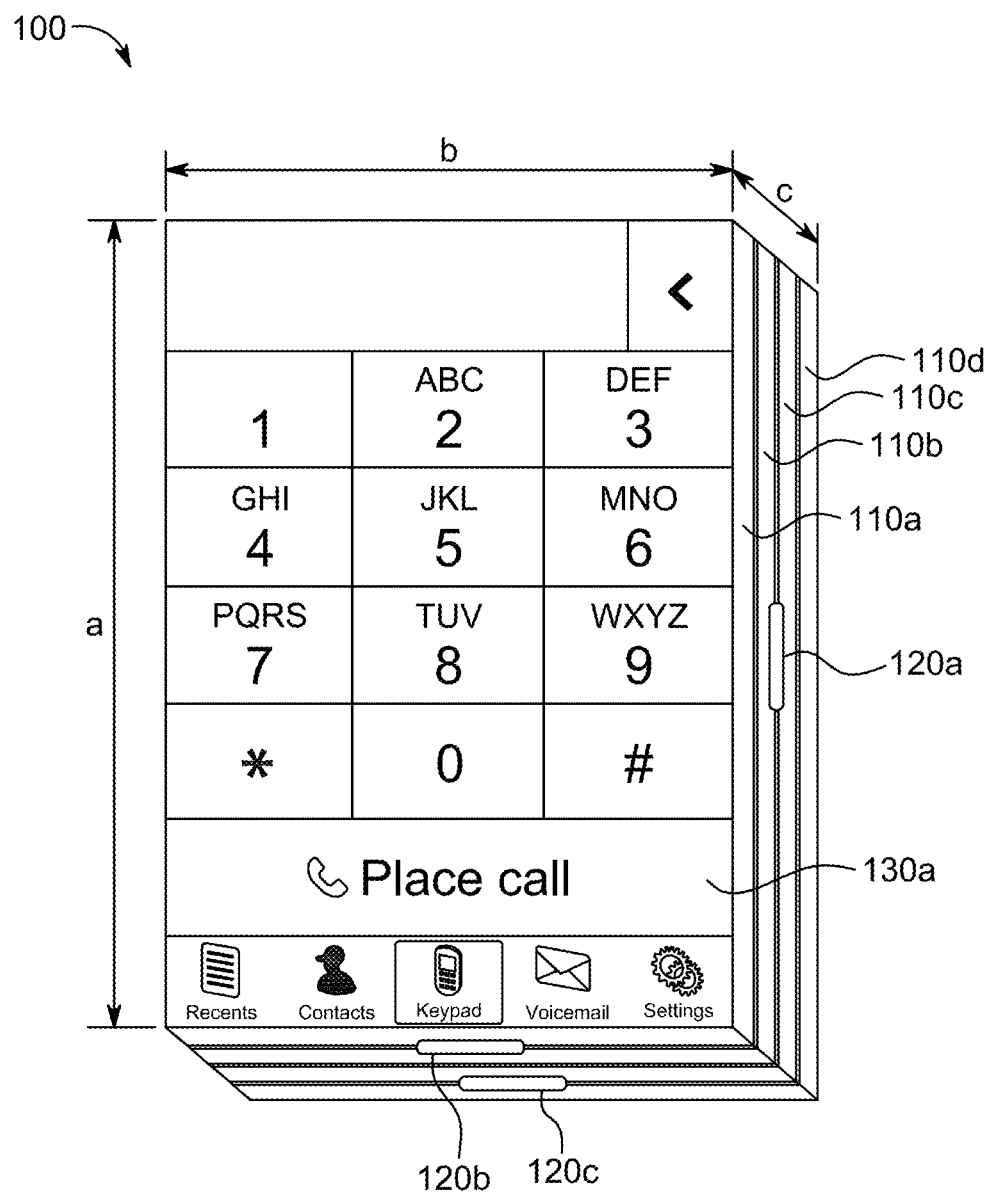
FIG. 1 illustrates an embodiment of a device in a folded configuration.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

As used in this disclosure, the term "connected" can include the presence of intervening elements. For example, if two physical devices are connected together, an intervening element may be present. An intervening element may also be present when the term "connected" is used in the context of electrical signals or in the case of computing elements or software modules where a computing element or software module may be connected to another element or module even though there are intervening elements. In such a case a connection can be wired or wireless. The terms "directly connected", "direct connection" or similarly worded terms are used when reference is made to a connection between two elements (logical or physical) with no intervening elements.

In the drawings and following description, certain elements are referenced individually with a letter following the numerical reference, for example 110a or 130d. Such references are to an individual element from a group of elements referenced collectively by the numerical reference. For example all elements 110a, 110b, 110c, 110d are referenced collectively by the single numerical reference 110.

FIG. 1 shows a device 100 with several panels. In this embodiment the device consists of 4 panels, 110a, 110b, 110c, 110d (collectively 110). Each of the panels has a display screen 130a, 130b, 130c, 130d (collectively 130) visible on one side of the corresponding panel. Display screen 130a corresponding to panel 110a can be seen in FIG. 1. The display 130 can take the form of a conventional thin screen display employing any of a variety of display technologies such as LED, LCD, or OLED.

The device 100 is shown in a compact, or in this specific embodiment a folded mode, where the various panels are stacked on top of each other, along dimension "c". In this specific embodiment, when folded, the panels are held together with hinges 120b and 120c at the bottom and one hinge 120a to the right. The right hinge 120a connects the two middle panels 110b, 110c and the bottom hinges 120b, 120c connect the external panels to panels 110b and 110c in the middle of the stack. The device may be retained in the folded mode via conventional mechanisms including a mechanical force applied by one or more of the hinges 120 or via a magnetic force provided via one or more of the hinges 120 or via magnetic force provided elsewhere from one or more of the panels 110.

In the folded state shown in FIG. 1, in this embodiment, the outer panels, 110a and 110d are disposed such that that the display side 130 of the panels 110 are facing outward, allowing the user to view and use the outer screens by flipping the device. Each panel is of size a×b. The embodiment shown in FIG. 1, has two hinges 120b and 120c on the bottom, and one on the right 120a. The use of the word hinge does not necessarily mean a mechanical rotating device, but rather includes alternate mechanisms that permit the panels to be open and closed from the folded state to a fully or partially open state.

Each of the panels 110 preferably incorporates a display screen 130 that employs a touch sensitive mechanism by which the user may input selections and other information. For example, FIG. 1 shows display screen 130a displaying a telephone keypad to allow a user to dial a telephone number. Each of the keys of the telephone keypad comprises a user input section, in other words a portion of the display which when touched by a finger or other touch device (such as for example a stylus) causes the portable device to carry out a programmed function. Certain embodiments of the device 100 may also incorporate physical buttons on the device to simplify commonly performed operations.

Communication between the panels 110 may be achieved in a variety of ways. A magnetic hinge (shown in further detail in FIG. 6 at 630) may be paired with a set of exposed and lined up connectors. Other implementations to allow communication between the panels are possible and will likely depend in part on the mechanical connection between the panels.

Figure 2A:
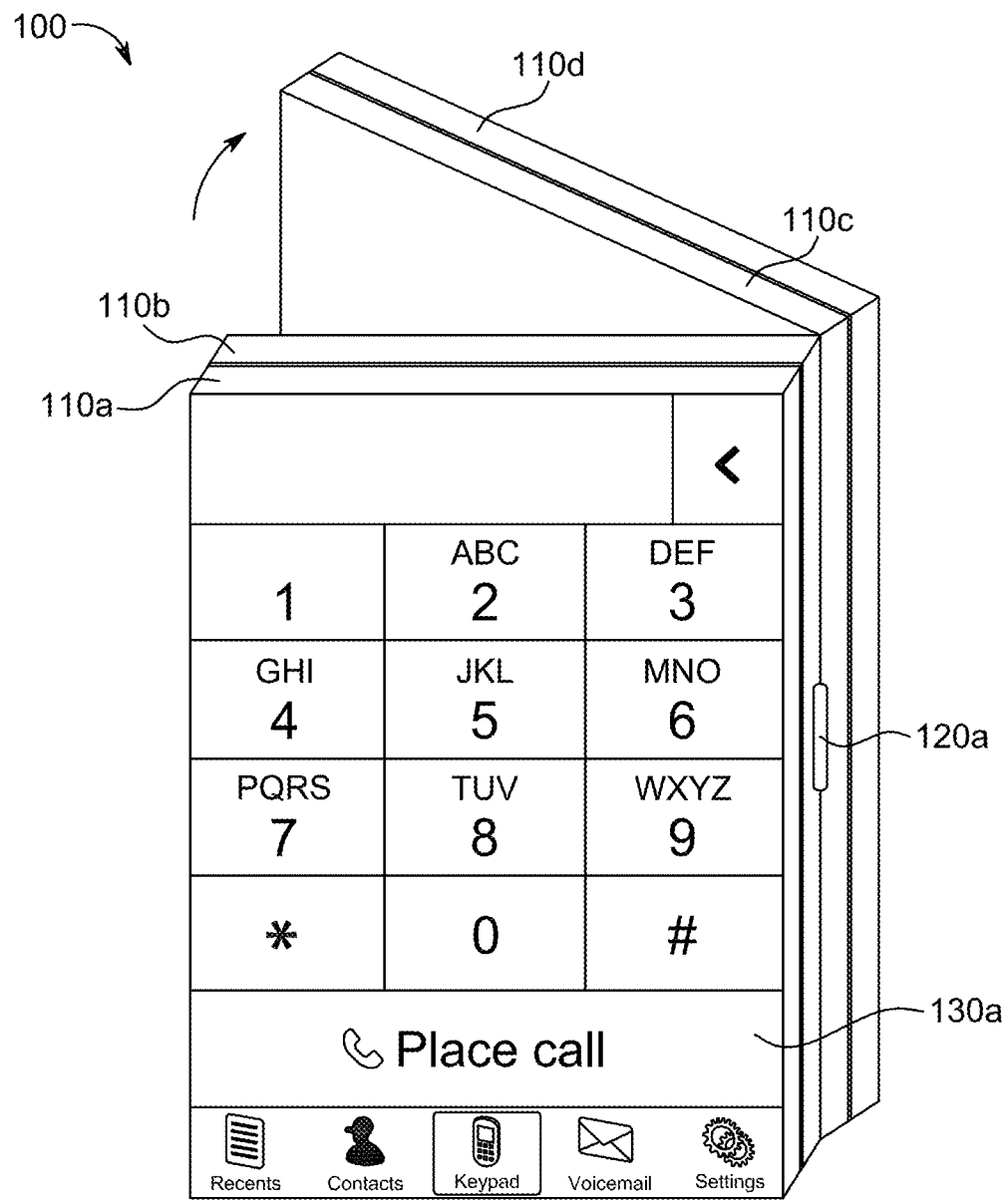
FIGS. 2A and 2B illustrate in alternative embodiments how hinges on the device permit unfolding.
Figure 2B:
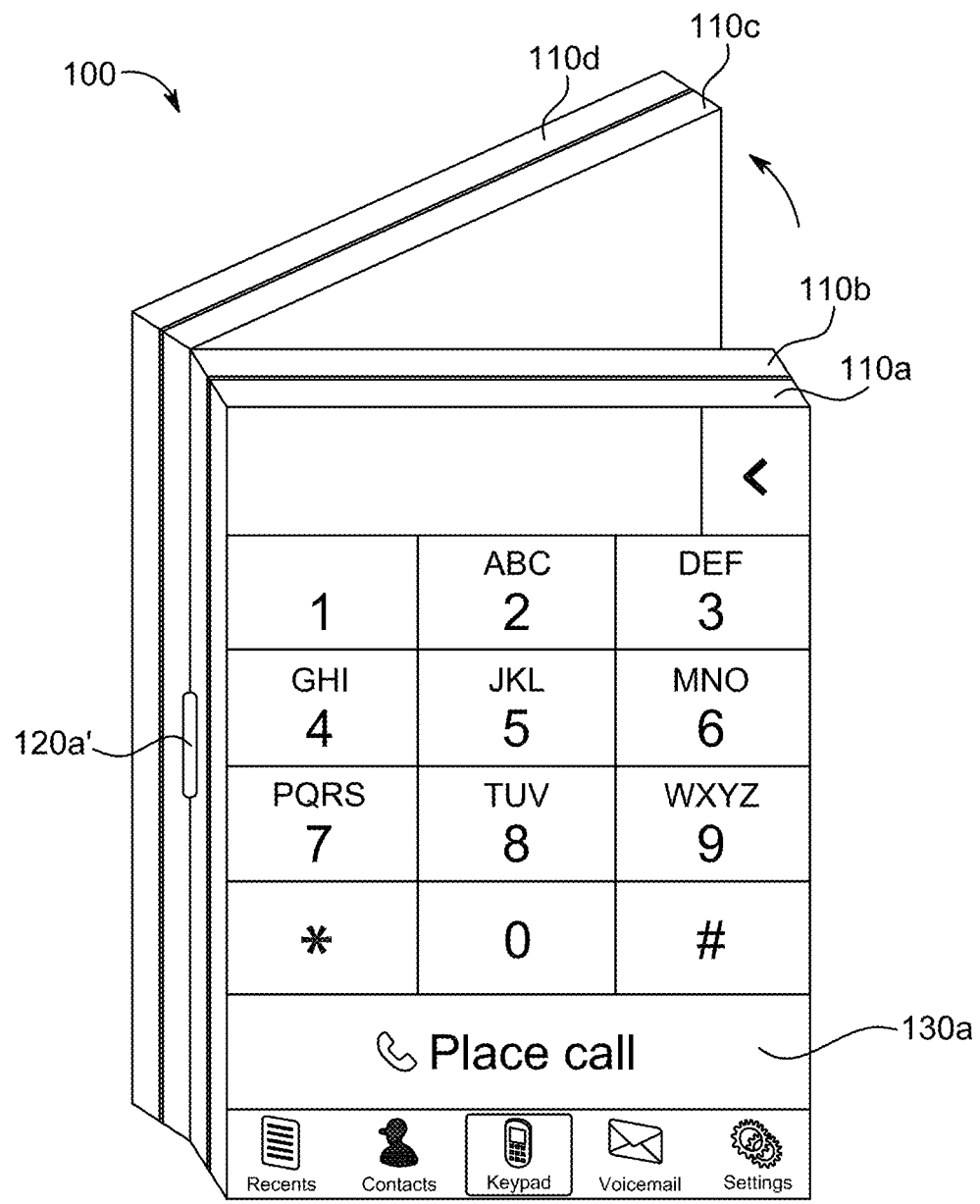

FIGS. 2A and 2B illustrate opening, or in this specific embodiment, unfolding of the device. FIG. 2A illustrates unfolding of the embodiment shown in FIG. 1 (with hinge 120a shown on the right side of the device) and specifically by unfolding of the device in FIG. 1 into an open or extended configuration. This step consists of separating the front and back panels 110a and 110d along with their respective attached internal panels 110b and 110c. FIG. 2B illustrates an alternative embodiment in which hinge 120a' is on the left side of the device.

Figure 3:
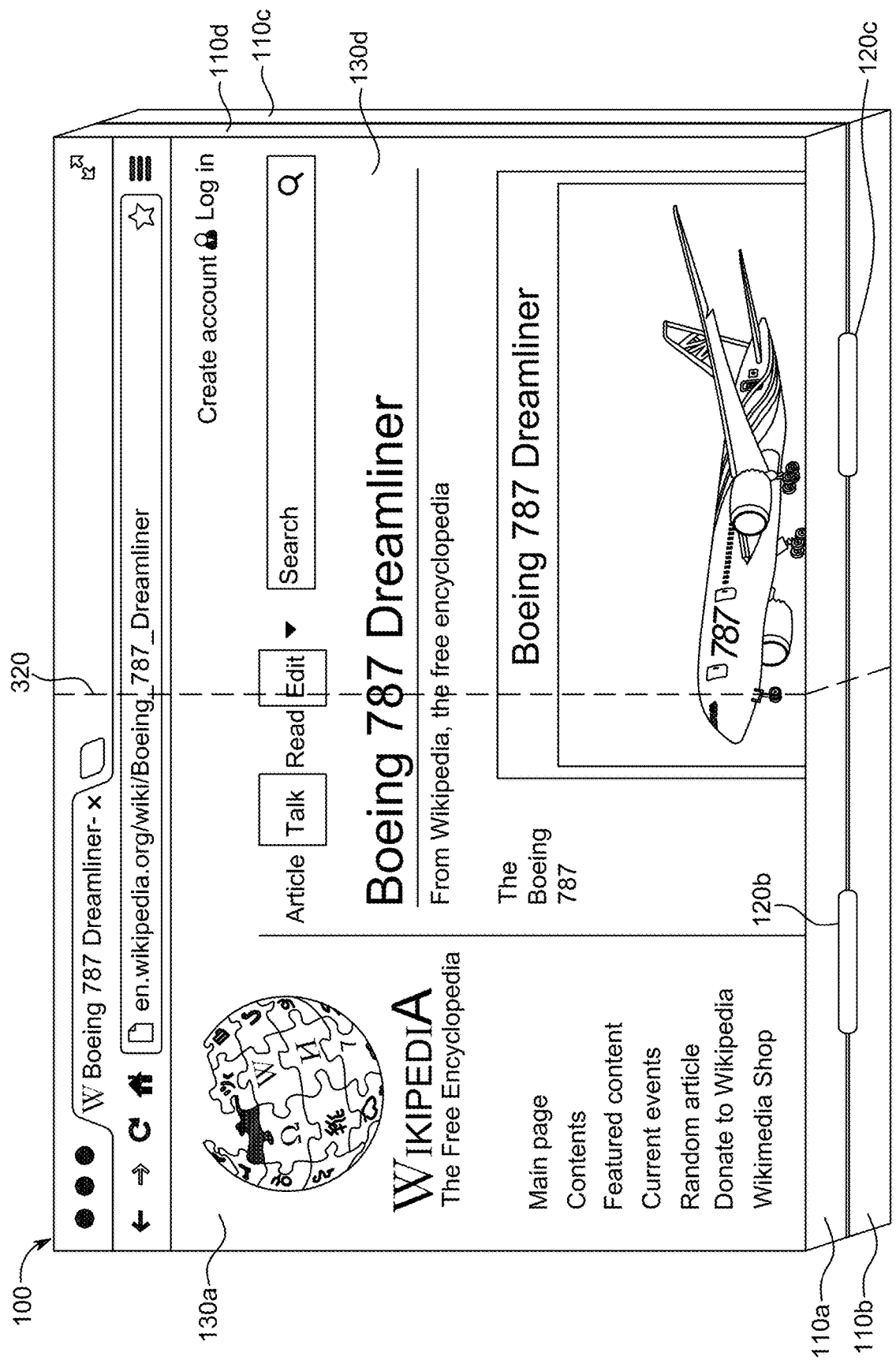
FIGS. 3 and 4 further illustrate unfolding of the device.

FIG. 3 shows the result derived from performing the step described in connection with FIGS. 2A and 2B to achieve a partially unfolded configuration in which outer panels 110a and 110d are adjacent to one another and inner panels 110b and 110c are adjacent to one another. The dotted line 320 represents the separation between the panels. Preferably the separation between display screen 130a and 130d is minimized to enhance the viewing experience. A variety of techniques may be employed to minimize the separation. In certain embodiments when the device is in the partially unfolded or half-open position, all panels will have the corresponding display screen 130a, 130b, 130c, 130d facing outward so the device can be used on both sides with the visible screen area being roughly twice the area, on each side of the device than when the device is in the fully folded or closed mode.

Figure 4:
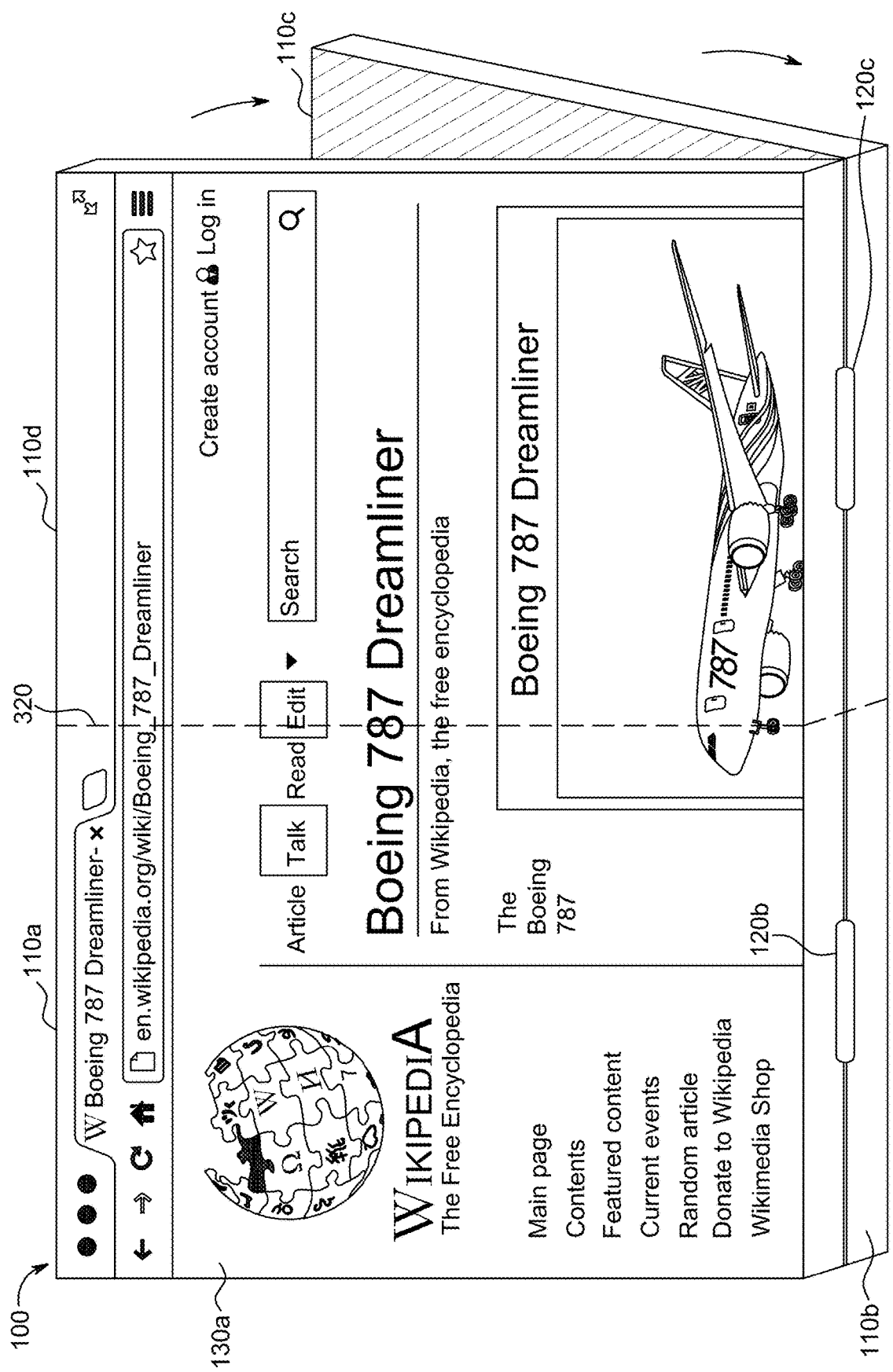

FIG. 4 shows further unfolding of the device 100 to permit the user to achieve the fully open mode of the device. In FIG. 4, panels 110b and 110c rotate about hinges 120b and 120c to change the device from the partially open or unfolded state to the fully open mode of the device.

Figure 5:
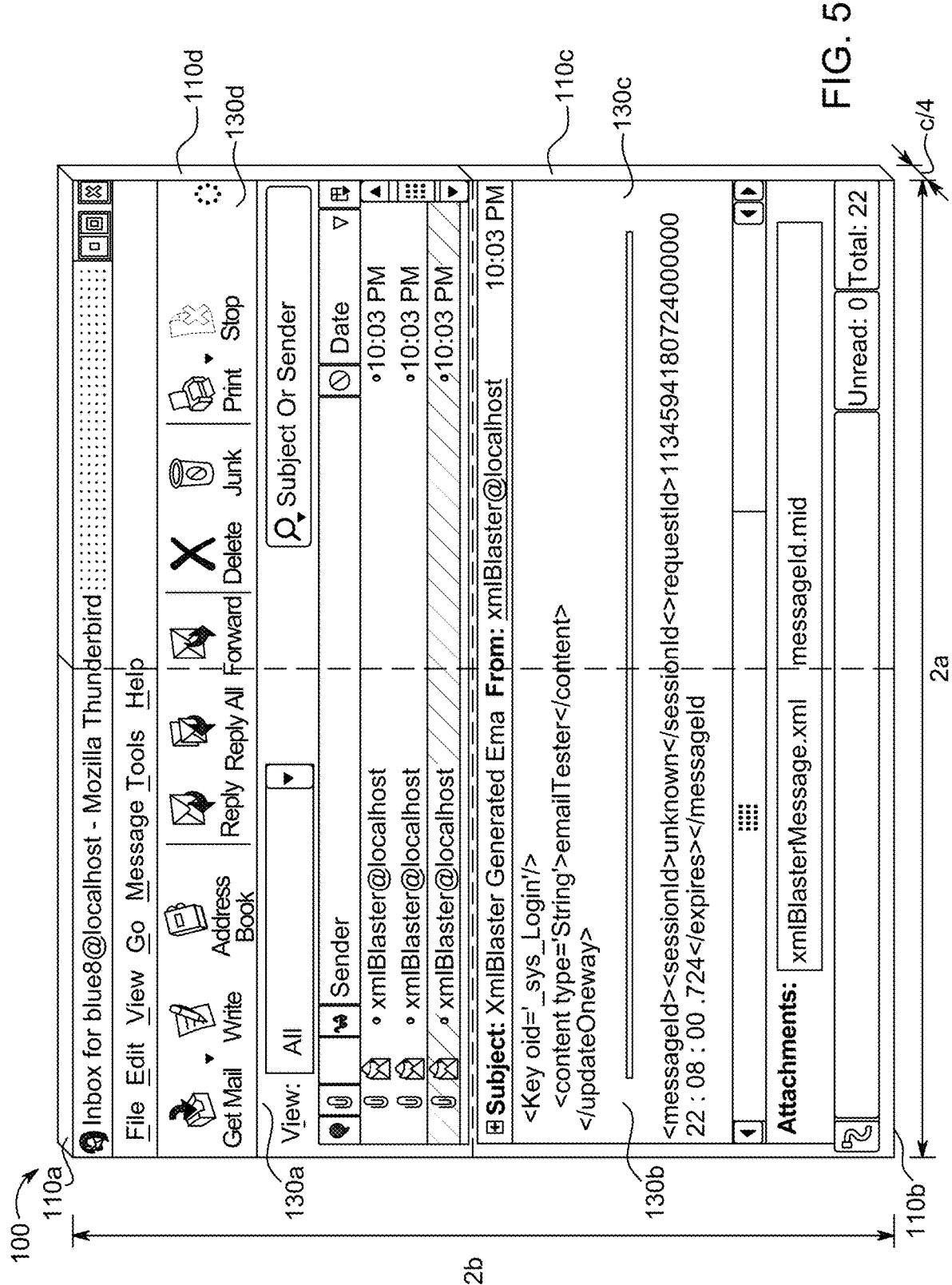
FIG. 5 shows the device in a fully unfolded configuration.

FIG. 5 shows the device 100 in the fully open mode. In this mode all display screens 130a, 130b, 130c, 130d are adjacent and are facing in the same direction. The size of the unfolded device is 2a by 2b and c/4 in depth, or in other words approximately twice the length along two dimensions and approximately ¼ the length along a third dimension than when in the fully closed or folded mode. In such a mode the device provides a form factor similar to commonly available tablets.

Figure 6:
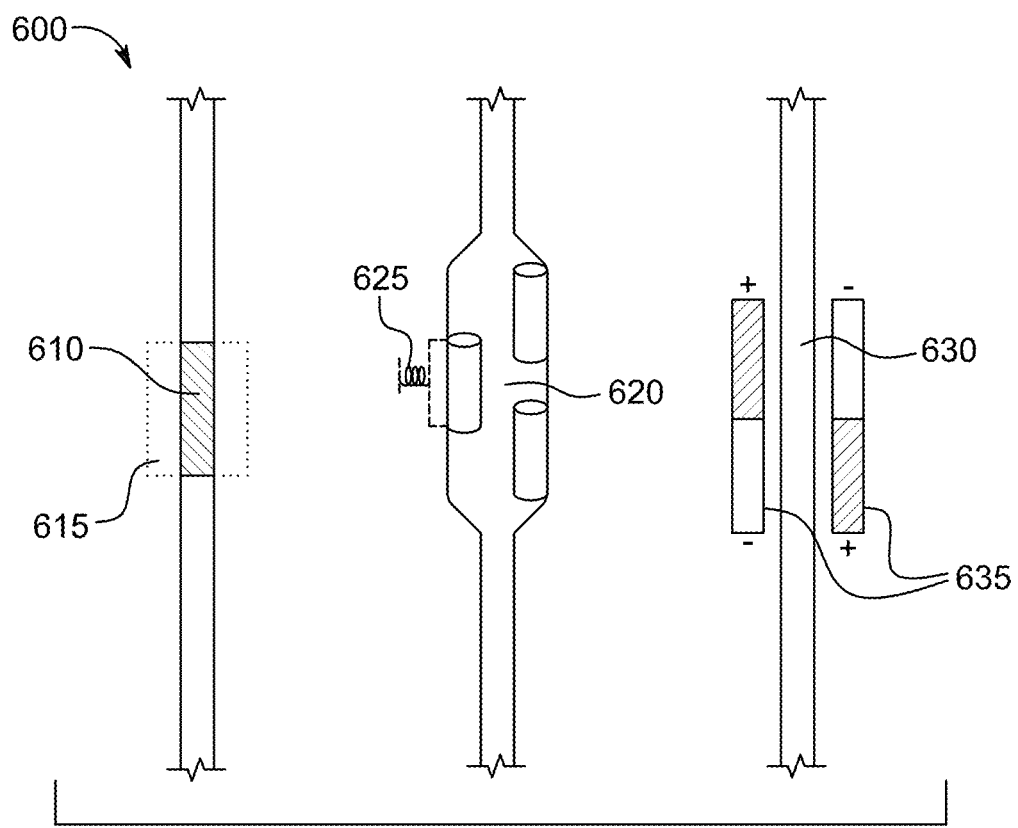
FIG. 6 illustrates multiple embodiments of hinging and/or connecting the multiple panels of the device.

Turning to FIG. 6, it can be seen that the hinges 120a, 120b and 120c may take a variety of shapes, forms and materials. Here are some embodiments of hinges: metallic, elastic, plastic, Velcro, magnetic, electromagnetic, mechanical, a rotary shaft comprising a first end and an opposite second end, wherein the first end extends through the through hole. In general, any type of mechanism that allows the sides to align and be physically attached in a manner so the panels do not move relative to one another when in the closed position and permit unfolding of the panels into an open position will suffice.

Embodiment 610 shows an elastic material, such as rubber, to keep the panels together. Area 615 shows the area of the material that anchors it to the device 100. An alternative embodiment is shown at 620, which is a traditional mechanical arrangement with a cylindrical socket and a shaft that connects both panels. The hinge 620 employs a spring mechanism 625 that provides the necessary elasticity for the device folding or unfolding operation. Yet another alternative type of hinge is shown at 630, which is a magnetic hinge mechanism based on the principle that opposite poles (North+, and South−) attract as shown at 635. This can clearly be an electro magnetic solution based on the same principles. The foregoing is merely illustrative of the various types of hinge mechanisms that may be employed. Alternatives will be apparent to those skilled in the art in view of the present disclosure.

Embodiments advantageously provide the ability to extend the screen size to a size that is approximately four times the surface of the device in its fully closed state. This enables easier web browsing, newspaper reading, movie viewing along with more interactive tasks such as preparation of a presentation or a spreadsheet, or drafting of a report.

Once the user is at home, back in the office or in an environment where the device can electronically couple via a wireless protocol (such as Bluetooth) to an external device such as a monitor, a mouse, a keyboard, a gesture based I/O, a TV screen, a printer etcetera, the user will be able to use these peripherals to interact with the device via a simple, intuitive interface, such as a single click of a button, that may be a physical button on the device or designated icon on a touch screen interface.

The mobile device electronically couples to an external device by scanning for other devices and peripherals, identifying the external devices and listing them for selection by the user. Upon a user triggered request, the mobile device establishes a handshake, identifies the optimal settings for the external device or peripheral and creates a wireless connection with optimal settings.

Advantageously, a mobile device employing principles of the invention is able to seamlessly connect in an optimized manner to external resources. Whether it is the network through WiFi or some other protocol, a printer at 300 dpi, or a full I/O device like a connected TV, a keyboard and a pointing device, mobile devices in conjunction with selected external resources employing the principles disclosed herein, optimize the connection to provide a simplified, high quality user experience. Different external resources have different parameters. For example an Internet connection may have download and/or upload speed as its only parameter. Thus to optimize it the connection should leverage the full possible speed. A printer or a monitor may have two main parameters: the density of pixels and the display ratio. The monitor supports a set of display ratios and so does the mobile device, thus the only available display ratios are the ones in common between the device and the monitor. Within those displays the mobile device selects the one that has the largest density that it supports. In this example the optimization is achieved by using a combination of parametric elimination and a rule-based system. There are other techniques that can be used such as tradeoff systems to achieve optimal solutions. In general, various combinations of rule-based systems, parametric elimination and tradeoff systems may be employed. The level of complexity of the system will depend on the number of parameters that need to be configured in the optimized connection. In a system with N customizable parameters with each M(n) settings, the number of hypothetical combinations is N*sum(M(n)) or N*M. Most often, all these combinations are not feasible and therefore various techniques such as provided by rule-based systems, parametric elimination or tradeoff systems will need to be employed.

A key type of communication that needs to be established is between the mobile device and an external display device such as a monitor, a TV, a projector, or other type of external display that may even provide 3D capability such as projection of a hologram. Achieving a simplified user experience requires that every external device or equipment capable of seamlessly connecting with mobile devices transmits on a frequent basis a signal indicating presence, which is referred to herein as the locator. Upon detection of such a locator signal, the mobile device generates a response to establish a handshake. In the handshake, the two devices acknowledge each other, agree on a communication protocol and exchange information and settings requirements. Once this exchange is done and the mobile device is aware of the display settings, it calculates the most effective, or optimal, way to establish a communication after prompting the user to select the external resource. By doing so, a user no longer needs anything else other than the single ubiquitous mobile device and wherever he is, he will have the best solution for his task and his environment.

Figure 7:
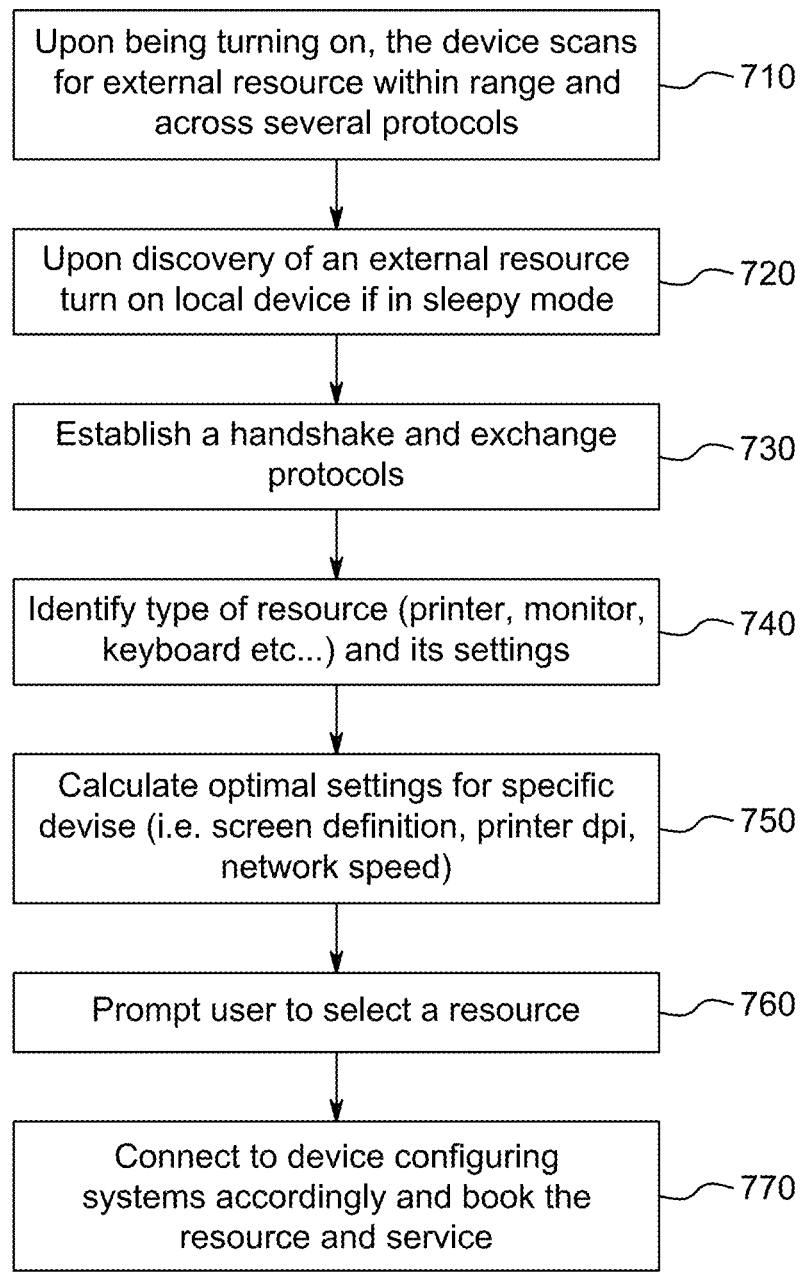
FIG. 7 is a flow diagram illustrating steps performed to enable communication between the device and an external device.

FIG. 7 illustrates for certain embodiments of device 100, the flow of events related to establishing a connection to a multitude of digital and electronic systems. These systems include external devices such as other devices, external equipment and peripherals such as keyboards, I/O devices, large screen monitors, television sets, digital pen, mouse, docking stations for older generation devices, servers, printers, scanners, card readers, storage devices, as well as networks on which equipment, and peripherals are connected. These will be referred to collectively as external resources.

In this embodiment, in the first step, 710, the process is triggered when the device is brought up from a state of energy saving, such as hibernation, stand by, or simply when it is shut down. Upon turning on the device, it will scan its vicinity, for wireless or connected signal and will attempt to discover the various external resources. The scanning will occur over various bandwidths and connections, such as WiFi, Bluetooth, etcetera. If the device is in sleepy mode, the discovery of an external resource would turn on the device if it is in sleepy mode, 720.

Upon detection of an external resource, 730, an attempt to establish a dialog will be made. This is known as the handshake. In this process the device 100 and the external resource will exchange information such as identification, and establish a communication protocol. The next step, 740, will be to exchange information about the services provided, i.e., "I am a TV and my definition is 720p and I can connect via Bluetooth, I also provide audio capability" or "I am a black and white laser printer and I can print with 75 dpi, 120 dpi and 300 dpi". In this step, the device 100 will collect the necessary information to understand the function or service offered by the external resource as well as its capabilities. With this information the device 100 will be able to calculate the optimal settings for the exchange of service, 750. The device 100 will then prompt the user to select a resource from a list of currently available resources, 760. Once the selection is made, the device 100 will configure both itself and the resource, 770. This includes downloading drivers if necessary, changing attributes in set up and configuration files or possibly launching services or programs. In addition, the device 100 will book, the resource or the service as applicable. For example when using a monitor and keyboard, the status of these peripherals will be turned to "in use" so they will not be available for other devices attempting to connect to them.

The device 100 provides computing, communication and Input/Output (I/O) capability via known hardware and software. For example, the device 100 includes a printed circuit board which has mounted thereupon one or more processors and associated memory, for executing software programs, I/O hardware and software, and communications hardware, including on or more transceivers and processors, for receiving and transmitting preferably in accordance with a plurality of communications protocols, such as for example, 3G/4G voice and data communications, WiFi, and Bluetooth. Additionally, the device 100 includes one or more batteries to provide electrical energy.

In one embodiment, the core computing and communications capabilities are contained in a single panel (the primary panel), with the other panels (secondary panels) containing minimal processing capability. In such an embodiment, the other panels may contain some localized hardware and software to enable efficient I/O, for example, for example, graphics processing capability and touchscreen input capability. In alternative embodiments, the secondary panels may have additional processing capability to supplement the capability of the primary panel when the secondary panels are being used. The communication connections between the panels will vary as a function of the amount and type of data that is transmitted/received between the panels.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A four-panel portable electronic device that can fold into three different configurations, comprising:
   a processor and memory for executing software programs;
   transceivers that receive and transmit data according to one or more communications protocols;
   a display made of four equally sized parts each having a viewing surface; and
   a housing consisting of four equally sized panels that are hinged together, wherein the four equally sized parts of the display each mounted on a separate one of the panels, wherein the processor, the memory, and the transceivers are contained within the housing, wherein the housing is foldable into three different configurations producing three different sized display areas, wherein the four equally sized panels are hinged together to arrange the four-panel electronic device into three different configurations.

2. The four-panel portable electronic device of claim 1, wherein the four equally sized panels are hinged together to arrange the four-panel electronic device into three different configurations including:
   a fully open configuration where the four equally sized panels are unfolded so that all four equally sized parts of the display are oriented on the same side of the four-panel electronic device adjacent to each other to form a single viewing surface; and
   an intermediate folded configuration where the four equally sized panels are folded to form two separate viewing surfaces on opposite sides of the four-panel electronic device that are each made of two of the four equally sized parts of the display so that the display can be used on both opposing sides of the device
   a fully folded configuration where each of the four equally sized panels are stacked on top of each other with one separate panel forming a bottom panel of the fully folded configuration and another separate panel forming a top panel of the fully folded configuration, wherein the part of the display mounted on the bottom panel and the part of the display mounted on the top panel face outwardly from the device so that a user may view the display on both of the outward facing displays.

3. The four-panel portable electronic device of claim 2, wherein the communications protocols include WiFi, Bluetooth, and a standard for a wireless communications network.

4. The four-panel portable electronic device of claim 3, further comprising a battery stored within one or more of the four-equally sized panels forming the housing, wherein the display is a touch screen.

5. The four-panel portable electronic device of claim 4, wherein each of the four equally sized panels is formed of a hexahedron having six flat sides, wherein four-panel electronic device has a configuration of a hexahedron having six flat sides when it is folded into each of its three different configurations, wherein one side of each panel is formed of one of the four equally sized parts of the display.

6. The four-panel portable electronic device of claim 5, wherein the four equally sized panels are hinged together by an elastic material, a magnetically operable hinge, or a hinge having a cylindrical socket, shaft and spring.

7. A four-panel portable electronic device that can fold into three different configurations, comprising:
   a housing consisting of four separate panels of equal size that are hinged together, wherein the housing is foldable between three different configurations: a fully folded configuration, a partially folded configuration, and a fully open configuration;
   a processor and memory contained within the housing for executing software programs;
   transceivers contained within the housing that receive and transmit data according to one or more communications protocols; and
   a display made of four parts of equal size, wherein in a fully folded configuration the four separate panels are stacked on top of each other vertically with one part of the display facing outwardly from a top surface of the device and one part of the display facing outwardly from a bottom surface of the device, wherein in a partially folded configuration the panels are folded so that all four parts of the display are visible with two parts adjacent to each other on opposite sides of the device, wherein in a fully open configuration the panels are folded so that all four parts of the display are positioned adjacent to each other on the same side of the device.

8. The four-panel portable electronic device of claim 7, wherein the communications protocols include WiFi, Bluetooth, and a standard for a wireless communications network, wherein both of the displays facing outwardly in the fully folded configuration are useable, wherein all four parts of the display on opposites sides of the device are useable in the partially folded configuration.

9. The four-panel portable electronic device of claim 7, further comprising a battery stored within the housing, wherein the display is a touch screen.

10. The four-panel portable electronic device of claim 9, wherein each of the four panels is formed of a hexahedron having six flat sides, wherein four-panel electronic device has a configuration of a hexahedron having six flat sides when it is folded into each of its three different configurations, wherein one side of each panel is formed of one of the four parts of the display.

11. The four-panel portable electronic device of claim 10, wherein the four panels are hinged together by an elastic material, a magnetically operable hinge, or a hinge having a cylindrical socket, shaft and spring.

12. A four-panel portable electronic device that can fold into three different configurations, comprising:
a display made of four parts of equal size;
a housing consisting of four separate panels of equal size, wherein the four separate panels are hinged together, wherein each of the four parts of the display is mounted on one of the four separate panels, wherein the housing is foldable between three different configurations: a fully folded configuration where two parts of the display are viewable on opposite sides of the housing, a partially folded configuration where all four parts of the display are viewable with two parts of the display positioned adjacent to the each other on opposite sides of the housing, and a fully open configuration where all four parts of the display are viewable on the same side of the housing;
a processor and memory contained within the housing for executing software programs; and
transceivers contained within the housing that receive and transmit data according to one or more communications protocols.

13. The four-panel portable electronic device of claim 12, wherein in the fully folded configuration the four separate panels are stacked on top of each other vertically with one part of the display facing outwardly from a top surface of the device and one part of the display facing outwardly from a bottom surface of the device so that a user may view the display on both of the outward facing displays, wherein two parts of the display are not viewable as they are located between the stacked panels.

14. The four-panel portable electronic device of claim 13, wherein in a partially folded configuration the panels are folded so that two panels are placed adjacently side-by-side of each other with the other two panels stacked on top and adjacently to each other side-by-side so that the display can be used on both opposing sides of the device.

15. The four-panel portable electronic device of claim 14, wherein in a fully open configuration the panels are folded such that no panel is stacked upon another with all panels laying horizontally on the same plane.

16. The four-panel portable electronic device of claim 15, wherein the communications protocols include WiFi, Bluetooth, and a standard for a wireless communications network.

17. The four-panel portable electronic device of claim 16, further comprising a battery stored within the housing, wherein the display is a touch screen.

18. The four-panel portable electronic device of claim 17, wherein each of the four panels is formed of a hexahedron having six flat sides, wherein four-panel electronic device has a configuration of a hexahedron having six flat sides when it is folded into each of its three different configurations, wherein one side of each panel is formed of one of the four parts of the display.

19. The four-panel portable electronic device of claim 18, wherein the four panels are hinged together by an elastic material, a magnetically operable hinge, or a hinge having a cylindrical socket, shaft and spring.

20. The four-panel portable electronic device of claim 12, wherein a first panel and second panel are hinged together along a vertical side of the first panel and a vertical side of the second panel, wherein a third panel is hinged along a horizontal side of the first panel, wherein a fourth panel is hinged along a horizontal side of the second panel.

21. A four-panel portable electronic device that can fold into three different configurations, comprising:
a housing consisting of four separate panels of equal size that are hinged together, wherein the housing is foldable between three different configurations: a fully folded configuration, a partially folded configuration, and a fully open configuration;
a processor and memory contained within the housing for executing software programs; transceivers contained within the housing that receive and transmit data according to one or more communications protocols; and
a display made of four parts of equal size, wherein one part of the display is on each of the four separate panels of the housing, wherein in a fully folded configuration one-fourth of the total display is viewable on a top surface of the fully folded configuration and one-fourth of the total display is viewable on a bottom surface of the fully folded configuration, wherein in a partially folded configuration one-half of the display is viewable on a top surface of the partially folded configuration and one-half of the display is viewable on a bottom surface of the partially folded configuration, wherein in a fully open configuration all of the display is viewable on a top surface of the a fully open configuration.

22. The four-panel portable electronic device of claim 21, wherein a first panel and second panel are hinged together along a vertical side of the first panel and a vertical side of the second panel, wherein a third panel is hinged along a horizontal side of the first panel, wherein a fourth panel is hinged along a horizontal side of the second panel.

23. A four-panel portable electronic device that can fold into three different configurations, comprising:
a housing consisting of four separate panels of equal size that are hinged together, wherein the housing is foldable between three different configurations: a fully folded configuration, a partially folded configuration, and a fully open configuration;
a processor and memory contained within the housing for executing software programs; transceivers contained within the housing that receive and transmit data according to one or more communications protocols; and a display made of four parts of equal size, wherein in a fully open configuration the panels are folded so that all four parts of the display are positioned adjacent to each other on the same side of the device, wherein in a partially folded configuration the fully open configuration is folded in half so that all four parts of the display are visible with two parts adjacent to each other on opposite sides of the device, wherein in a fully folded configuration the partially folded configuration is folded in half so that the four separate panels are stacked on top of each other vertically with one part of the display facing outwardly from a top surface of the device and one part of the display facing outwardly from a bottom surface of the device and the other two parts of the display are not visible outwardly being stacked internally between the outward facing parts.

* * * * *